(12) United States Patent
Martino et al.

(10) Patent No.: US 11,880,849 B2
(45) Date of Patent: Jan. 23, 2024

(54) SYSTEM AND METHOD FOR MAINTAINING METADATA CORRECTNESS

(71) Applicant: Aggregate Knowledge, LLC, Sterling, VA (US)

(72) Inventors: Paul Martino, Mountain View, CA (US); Gian-Paolo Musumeci, Berkeley, CA (US); Kristopher C. Wehner, Oakland, CA (US)

(73) Assignee: Aggregate Knowledge, LLC, Reston, VA (US)

( * ) Notice: Subject to any disclaimer, the term of this patent is extended or adjusted under 35 U.S.C. 154(b) by 0 days.

(21) Appl. No.: 17/498,191

(22) Filed: Oct. 11, 2021

(65) Prior Publication Data
US 2022/0277318 A1    Sep. 1, 2022

Related U.S. Application Data

(63) Continuation of application No. 15/985,553, filed on May 21, 2018, now Pat. No. 11,144,933, which is a continuation of application No. 12/072,454, filed on Feb. 26, 2008, now abandoned.

(60) Provisional application No. 60/962,552, filed on Jul. 30, 2007.

(51) Int. Cl.
*G06Q 30/02* (2023.01)
*G06F 16/958* (2019.01)

(52) U.S. Cl.
CPC .......... *G06Q 30/02* (2013.01); *G06F 16/972* (2019.01)

(58) Field of Classification Search
None
See application file for complete search history.

(56) References Cited

U.S. PATENT DOCUMENTS

| | | |
|---|---|---|
| 4,258,386 A | 3/1981 | Cheung |
| 4,546,382 A | 10/1985 | McKenna et al. |
| 4,833,308 A | 5/1989 | Humble |
| 4,930,011 A | 5/1990 | Kiewit |
| 4,972,504 A | 11/1990 | Daniel, Jr. et al. |
| 5,019,961 A | 5/1991 | Addesso et al. |
| 5,099,319 A | 3/1992 | Esch et al. |
| 5,117,349 A | 5/1992 | Tirfing et al. |
| 5,128,752 A | 7/1992 | Von Kohorn |
| 5,155,591 A | 10/1992 | Wachob |
| 5,201,010 A | 4/1993 | Deaton et al. |
| 5,223,924 A | 6/1993 | Strubbe |
| 5,227,874 A | 7/1993 | Von Kohorn |

(Continued)

OTHER PUBLICATIONS

Knezevic Predrag Apr. 2007. High Data Availability and Consistency for Distributed Hash Tables Deployed in Dynamic Peer-to-peer Communities.*

(Continued)

*Primary Examiner* — Tuankhanh D Phan
(74) *Attorney, Agent, or Firm* — Sterne, Kessler, Goldstein & Fox P.L.L.C.

(57) ABSTRACT

A method is disclosed. The method includes a relationship server receiving a discovery service request from a client computer, the relationship server comparing metadata provided in the discovery service request against a database and a crawler retrieving updated metadata from a commerce server for if the metadata provided in the discovery service request does not match the metadata stored in the database column.

12 Claims, 7 Drawing Sheets

(56) References Cited

U.S. PATENT DOCUMENTS

| | | |
|---|---|---|
| 5,231,494 A | 7/1993 | Wachob |
| 5,237,620 A | 8/1993 | Deaton et al. |
| 5,249,262 A | 9/1993 | Baule |
| 5,285,278 A | 2/1994 | Holman |
| 5,305,196 A | 4/1994 | Deaton et al. |
| 5,315,093 A | 5/1994 | Stewart |
| 5,327,508 A | 7/1994 | Deaton et al. |
| 5,331,544 A | 7/1994 | Lu et al. |
| 5,351,075 A | 9/1994 | Herz et al. |
| 5,388,165 A | 2/1995 | Deaton et al. |
| 5,410,344 A | 4/1995 | Graves et al. |
| 5,430,644 A | 7/1995 | Deaton et al. |
| 5,446,919 A | 8/1995 | Wilkins |
| 5,448,471 A | 9/1995 | Deaton et al. |
| 5,471,610 A | 11/1995 | Kawaguchi et al. |
| 5,515,098 A | 5/1996 | Carles |
| 5,537,586 A | 7/1996 | Amram et al. |
| 5,544,049 A | 8/1996 | Henderson et al. |
| 5,559,549 A | 9/1996 | Hendricks et al. |
| 5,563,998 A | 10/1996 | Yaksich et al. |
| 5,563,999 A | 10/1996 | Yaksich et al. |
| 5,592,560 A | 1/1997 | Deaton et al. |
| 5,604,542 A | 2/1997 | Dedrick |
| 5,608,447 A | 3/1997 | Farry et al. |
| 5,619,709 A | 4/1997 | Caid et al. |
| 5,621,812 A | 4/1997 | Deaton et al. |
| 5,632,007 A | 5/1997 | Freeman |
| 5,636,346 A | 6/1997 | Saxe |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,186 A | 7/1997 | Ferguson |
| 5,659,469 A | 8/1997 | Deaton et al. |
| 5,661,516 A | 8/1997 | Carles |
| 5,675,662 A | 10/1997 | Deaton et al. |
| 5,687,322 A | 11/1997 | Deaton et al. |
| 5,704,017 A | 12/1997 | Heckerman et al. |
| 5,724,521 A | 3/1998 | Dedrick |
| 5,740,549 A | 4/1998 | Reilly et al. |
| 5,754,938 A | 5/1998 | Herz et al. |
| 5,754,939 A | 5/1998 | Herz et al. |
| 5,758,257 A | 5/1998 | Herz et al. |
| 5,758,259 A | 5/1998 | Lawler |
| 5,761,601 A | 6/1998 | Nemirofsky et al. |
| 5,761,662 A | 6/1998 | Dasan |
| 5,774,170 A | 6/1998 | Hite et al. |
| 5,774,868 A | 6/1998 | Cragun et al. |
| 5,786,845 A | 7/1998 | Tsuria |
| 5,794,210 A | 8/1998 | Goldhaber et al. |
| 5,796,952 A | 8/1998 | Davis et al. |
| 5,805,974 A | 9/1998 | Hite et al. |
| 5,832,457 A | 11/1998 | O'Brien et al. |
| 5,835,087 A | 11/1998 | Herz et al. |
| 5,848,396 A | 12/1998 | Gerace |
| 5,867,799 A | 2/1999 | Lang et al. |
| 5,918,014 A | 6/1999 | Robinson |
| 5,926,205 A | 7/1999 | Krause et al. |
| 5,930,764 A | 7/1999 | Melchione et al. |
| 5,933,811 A | 8/1999 | Angles et al. |
| 5,948,061 A | 9/1999 | Merriman et al. |
| 5,970,469 A | 10/1999 | Scroggie et al. |
| 5,974,396 A | 10/1999 | Anderson et al. |
| 5,974,399 A | 10/1999 | Giuliani et al. |
| 5,977,964 A | 11/1999 | Williams et al. |
| 5,978,799 A | 11/1999 | Hirsch |
| 5,991,735 A | 11/1999 | Gerace |
| 6,002,393 A | 12/1999 | Hite et al. |
| 6,005,597 A | 12/1999 | Barrett et al. |
| 6,009,409 A | 12/1999 | Adler et al. |
| 6,009,410 A | 12/1999 | LeMole et al. |
| 6,012,051 A | 1/2000 | Sammon, Jr. et al. |
| 6,014,634 A | 1/2000 | Scroggie et al. |
| 6,020,883 A | 2/2000 | Herz et al. |
| 6,026,370 A | 2/2000 | Jermyn |
| 6,029,195 A | 2/2000 | Herz |
| 6,035,280 A | 3/2000 | Christensen |
| 6,038,591 A | 3/2000 | Wolfe et al. |
| 6,055,573 A | 4/2000 | Gardenswartz et al. |
| 6,084,628 A | 7/2000 | Sawyer |
| 6,088,722 A | 7/2000 | Herz et al. |
| 6,119,098 A | 9/2000 | Guyot et al. |
| 6,134,532 A | 10/2000 | Lazarus et al. |
| 6,160,570 A | 12/2000 | Sitnik |
| 6,160,989 A | 12/2000 | Herndricks et al. |
| 6,177,931 B1 | 1/2001 | Alexander et al. |
| 6,185,541 B1 | 2/2001 | Scroggie et al. |
| 6,216,129 B1 | 4/2001 | Eldering |
| 6,236,978 B1 | 5/2001 | Tuzhilin |
| 6,266,649 B1 | 7/2001 | Linden et al. |
| 6,285,999 B1 | 9/2001 | Page |
| 6,298,348 B1 | 10/2001 | Eldering |
| 6,317,722 B1 | 11/2001 | Jacobi et al. |
| 6,321,221 B1 | 11/2001 | Bieganski |
| 6,327,574 B1 | 12/2001 | Kramer et al. |
| 6,438,579 B1 | 8/2002 | Hosken |
| 6,457,010 B1 | 9/2002 | Eldering et al. |
| 6,560,578 B2 | 5/2003 | Eldering |
| 6,571,279 B1 | 5/2003 | Herz et al. |
| 6,592,612 B1 | 7/2003 | Samson et al. |
| 6,643,696 B2 | 11/2003 | Davis et al. |
| 6,820,062 B1 | 11/2004 | Gupta et al. |
| 6,871,186 B1 | 3/2005 | Tuzhilin et al. |
| 7,062,510 B1 | 6/2006 | Eldering |
| 7,069,272 B2 | 6/2006 | Snyder |
| 7,080,070 B1 | 7/2006 | Gavarini |
| 7,080,139 B1 | 7/2006 | Briggs et al. |
| 7,216,123 B2 | 5/2007 | Kamvar et al. |
| 7,370,004 B1 | 5/2008 | Patel et al. |
| 7,693,827 B2 | 4/2010 | Zamir et al. |
| 7,797,440 B2 * | 9/2010 | Ganesan ............ H04L 63/0428 |
| | | 709/212 |
| 11,144,933 B2 | 10/2021 | Martino et al. |
| 2001/0014868 A1 | 8/2001 | Herz et al. |
| 2001/0021914 A1 | 9/2001 | Jacobi et al. |
| 2002/0095676 A1 | 7/2002 | Knee et al. |
| 2002/0099812 A1 | 7/2002 | Davis et al. |
| 2002/0143916 A1 | 10/2002 | Mendiola et al. |
| 2002/0194058 A1 | 12/2002 | Eldering |
| 2003/0037041 A1 | 2/2003 | Hertz |
| 2003/0088872 A1 | 5/2003 | Maissel et al. |
| 2003/0154442 A1 | 8/2003 | Papierniak |
| 2003/0204447 A1 | 10/2003 | Dalzell et al. |
| 2004/0088300 A1 | 5/2004 | Avery et al. |
| 2004/0122910 A1 | 6/2004 | Douglass et al. |
| 2004/0225578 A1 | 11/2004 | Hager et al. |
| 2005/0071251 A1 | 3/2005 | Linden et al. |
| 2005/0144455 A1 | 6/2005 | Haitsma |
| 2005/0182792 A1 | 8/2005 | Israel et al. |
| 2006/0080405 A1 | 4/2006 | Gibson |
| 2006/0113383 A1 | 6/2006 | Scott et al. |
| 2006/0200556 A1 | 9/2006 | Brave et al. |
| 2007/0053513 A1 | 3/2007 | Hoffberg |
| 2007/0118572 A1 | 5/2007 | Fischer et al. |
| 2008/0215979 A1 | 9/2008 | Clifton et al. |

OTHER PUBLICATIONS

Beeferman, Doug, et al., "Agglomerative Clustering of a Search Engine Query Log," Proc. Sixth ACM SIGKDD International Conference on Knowledge Discovery and Data Mining, Aug. 2000, 9 pages.

Billsus, Daniel, et al., "Learning Collaborative Information Filters," Proceedings of the Fifteenth International Conference on Machine Learning, Jul. 1998, 9 pages.

Bittner, M., et al., "Molecular Classification of Cutaneous Malignant Melanoma by Gene Expression Profiling," Nature, vol. 406, Aug. 3, 2000, pp. 536-538.

Boutilier, Craig, et al., "Active Collaborative Filtering," Proceedings of the Nineteenth conference on Uncertainty in Artificial Intelligence, Aug. 2002, 18 pages.

(56) References Cited

OTHER PUBLICATIONS

Brin, Sergey, et al., "Dynamic Itemset Counting and Implication Rules for Market Basket Data," ACM SIGMOD Record, Jun. 1997, 10 pages.
Broder, Andrei Z., et al., "Min-Wise Independent Permutations," Journal of Computer and System Sciences, vol. 60, 2000, pp. 630-659.
Butte, A. J., et al., "Mutual Information Relevance Networks: Functional Genomic Clustering Using Pairwise Entropy Measurements," Pacific Symposium Biocomputing, 2000, 24 pages.
Charikar, Moses S., et al., "Similarity Estimation Techniques from Rounding Algorithms," Proceedings of the Thirty-fourth Annual ACM Symposium on Theory of Computing, May 2002, 9 pages.
Chen, Kay-Yut, et al., "Eliminating Public Knowledge Biases in Information Aggregation Mechanisms," Management Science, vol. 50, No. 7, Jul. 2004, pp. 983-994.
Claypool, Mark, et al., "Combing Content-Based and Collaborative Filters in an Online Newspaper," Proceedings of the ACM SIGIR '99 Workshop on Recommender Systems: Algorithms and Evaluation, 1999, 16 pages.
Cosley, Dan, et al., "An open framework for practical testing of recommender systems using ReseachIndex," Proceedings of the 28th Very Large Databases Conference, 2002, 12 pages.
Craswell, Nick, et al., "An Experimental Comparison of Click Position-Bias Models," Proceedings of the 2008 International Conference on Web Search and Data Mining, Feb. 2008, 8 pages.
Das, Abhinandan, et al., "Google News Personalization: Scalable Online Collaborative Filtering," Proceedings of the 16th international conference on World Wide Web, May 2007, pp. 271-280.
Dhillon, Inderjit S., et al., "Information-Theoretic Co-clustering," Proceedings of the Ninth ACM SIGKDD International Conference on Knowledge Discovery and Data Mining, Aug. 2003, 10 pages.
Fraley, Chris, et al., "MCLUST Version 3: An R Package for Normal Mixture Modeling and Model-Based Clustering," Technical Report No. 504, Department of Statistics, University of Washington, Sep. 2006, 45 pages.
Gunduz, Sule, et al., "A Web Page Prediction Model Based on Click-Stream Tree Representation of User Behavior", Proceedings of the Ninth ACM SIGKDD International Conference on Knowledge Discovery and Data Mining, Aug. 2003, 6 pages.
Herlocker, Jonathan L., et al., "Evaluating Collaborative Filtering Recommender Systems," ACM Transactions on Information Systems, Jan. 2004, pp. 5-53.
Heymann, Paul, et al., "Can Social Bookmarking Improve Web Search?", Proceedings of the 2008 International Conference on Web Search Data Mining, Feb. 2008, 10 pages.
Joachims, Thorsten, "Evaluating Search Engines using Clickthrough Data," 2002, 13 pages.
Keerthi, S. S., "Support Vector Machines", circa 2005, 8 pages.
Cheung, Kwok-Wai, et al., "Mining Customer Product Ratings for Personalized Marketing," Decision Support Systems, vol. 35, Issue 2, May 2003, 21 pages.
Lawrence, R. D., et al., "Personalization of Supermarket Product Recommendations," IBM Research Report, Jul. 2000, 28 pages.
Linden, Greg, et al., "Amazon.com Recommendations," IEEE Internet Computing, Feb. 2003, pp. 76-80.
Madani, Omid, et al., "Contextual Recommender Problems," ACM Workshop on Utility Based Data Mining, Aug. 2005, pp. 86-89.
Madani, Omid, et al., "Using (Graphical) Probabilistic Generative Models for Recommendation", circa 2006, 22 pages.
Mehta, Bhaskar, et al., "Robust Collaborative Filtering," 2007, 35 pages.
Mulpuru, Sucharita, "Which Personalization Tools Work for eCommerce—and Why," Dec. 2007, 22 pages.
Paulson, Patrick, et al., "Combining Collaborative and Content-Based Filtering Using Conceptial Graphs," Modelling with Words, Lecture Notes in Computer Science, vol. 2873, Sprinder, 2003, 15 pages.
Pazzani, Michael J., "A Framework for Collaborative, Content-Based and Demographic Filtering," Artificial Intelligence Review 13: 939-408, 1999, 16 pages.
Pennock, David M., et al., "Collaborative Filerting by Personality Diagnosis: A Hybrid Memory- and Model-Based Approach," Uncertainty in Artificial Intelligence Proceedings, 2000, pp. 473-480.
Radlinski, Filip, et al., "Active Exploration for Learning Rankings from Clickthrough Data," Proceedings of the 13th ACM SIGKDD International Conference on Knowledge Discovery and Data Mining, Aug. 2007, pp. 570-579.
Sarwar, Badrul, et al., "Analysis of Recommendation Algorithms for E-Commerce," Proceedings of the 2nd ACM conference on Electronic Commerce, Oct. 2000, 8 pages.
Sarwar, Badrul, et al., "Item-based Collaborative Filtering Recommendation Algorithms," Proceedings of the 10th International Conference on World Wide Web, Apr. 2001, 15 pages.
Sarwar, Badrul M., et al., "Recommender Systems for Large-scale E-commerce: Scalable neighborhood Formation Using Clustering," Proceedings of the 5th International Conference on Computer and Information Technology, Dec. 2002, 6 pages.
Schein, Andrew I., et al., "Methods and Metrics for Cold-Start Recommendations," Proceedings of the 25th Annual International ACM SIGIR Conference on Research and Development in Information Retrieval, Aug. 2002, 9 pages.
Silverstein, Craig, et al., "Beyond Market Baskets: Generalizing Association Rules to Dependence Rules," Data Mining and Knowledge Discovery 2, 39-68 (1998), 30 pages.
Singhal, Amit, et al., "Pivoted Document Length Normalization," Proceedings of the 19th Annual International ACM SIGIR Conference on Research Development in Information Retrieval, Aug. 1996, pp. 21-29, 9 pages.
Tintarev, Nava, "Explanations of Recommendations," Proceedings of the 2007 ACM Conference on Recommender Systems, Oct. 2007, 5 pages.
Ungar, Lyle H., et al., "Clustering Methods for Collaborative Filtering," AAAI Workshop on Recommendation Systems, 1998, 11 pages.
Van Der Weide, Th.P., et al., "Individual and Collective Approaches for Searcher Satisfaction in IR," Technical Report CSI-R819, 1998, 12 pages.
Van Der Weide, Th.P., et al., "Measuring the Incremental Information Value of Documents," submitted to Information Sciences, 2006, 26 pages.
Vogt, Christopher C., "Passive Feedback Collection—An Attempt to Debunk the Myth of Clickthroughs," NIST Special Publication 500-249: The Ninth Text REtrieval Conference (TREC 9), Gaithersberg, MD, 2000, 9 pages.
Watts, Duncan J., et al., "Collective Dynamics of 'Small World' Networks," Nature 393, 440-442 (1998), 3 pages.
Wei, Yan Z., et al., "Learning Users' Interests by Quality Classification in Market-Based Recommender Systems," submitted to IEEE Transactions on Knowledge and Data Engineering, Mar. 2005, 27 pages.
Wietsma, Rene T., et al., "Product Reviews in Mobile Decision Aid Systems," PERMID 2005—Pervasive Mobile Interaction Devices—Mobile Devices as Pervasive User Interfaces and Interaction Devices—Workshop in conjunction with The 3rd International Conference on Pervasive Computing, May 2005, pp. 15-18, 4 pages.
Yip, Andy M., et al., "The Generalized Topological Overlap Matrix for Detecting Modules in Gene Networks," Proceedings of the 2006 International Conference on Bioinformatics & Computational Biology, BIOCOMP'06, Jun. 2006, 7 pages.

* cited by examiner

SYSTEM AND METHOD FOR MAINTAINING METADATA CORRECTNESS

CROSS-REFERENCE TO RELATED APPLICATIONS

This application is a Continuation of U.S. patent application Ser. No. 15/985,553, filed May 21, 2018; which is a Continuation of U.S. patent application Ser. No. 12/072,454, filed Feb. 26, 2008; which claims benefit of priority to U.S. Provisional Patent Application No. 60/962,552, filed Jul. 30, 2007; the aforementioned priority applications being hereby incorporated by reference in their respective entirety for all purposes.

COPYRIGHT AUTHORIZATION

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to maintaining metadata correctness. More specifically the invention relates to maintaining metadata correctness for a set of objects subscribing to a web service.

BACKGROUND

Metadata is data that is used to supplement other data. For example metadata can be used to describe information that is auxiliary to another piece of data or object. Examples of data or objects include products, web pages, photographs or any other piece of data that is capable of having data associated therewith. Using the photograph as an example of an object, metadata could include, but is not limited to: the type of camera used, the time of day it was taken, where the picture was taken, the size of lens used and the name of the photographer. Using a camera as an example of an object, metadata could include, but is not limited to: price, SKU number, manufacturer, stocking status and one or more thumbnail images.

Traditionally, this metadata is maintained by the entity that controls the object: the photographer that created the photograph or the retail outlet selling the camera, in keeping with the earlier examples. It is common for ancillary services to require access to this metadata. For example, going back to the photograph example, a search engine might need or want to provide a searchable interface to many photographs based on their metadata ("show me pictures by Ansel Adams taken after 9 p.m. in Alaska with an 8 inch lens"). Unfortunately, because the service does not maintain the metadata and any changes thereto, consistency and correctness problems may emerge.

Historically, these problems have been dealt with by accepting copies of the metadata, as well as incremental updates, from the owner, be it in bulk format (a dump), an explicit integration with external systems (an integration) or in a streaming format for incremental updates (a feed). These external data sources are then used to synchronize the changes in the catalog with the service's database. This approach is difficult to automate, prone to errors, time-intensive, and goes out of date due to the error prone nature of feeds and the complexity of their maintenance over time.

Therefore, what has been needed and heretofore unavailable is a system and method of maintaining metadata correctness that overcomes the shortcomings of the previous approaches.

SUMMARY

According to one embodiment, a method is disclosed. The method includes a relationship server that receives a discovery service request from a client computer, the relationship server compares the metadata provided in the discovery service request against a database and a crawler retrieves updated metadata from a commerce server if the metadata provided in the discovery service request does not match the metadata stored in the database column.

In a further embodiment, a network is disclosed. The network includes a plurality of commerce servers, a client computer to request a page including metadata from a first of the commerce servers corresponding to a product and a relationship server to receive a content request including the metadata from the client computer, to compare the received metadata to first metadata stored in a database and to validate the metadata if the received metadata does not match the first metadata.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
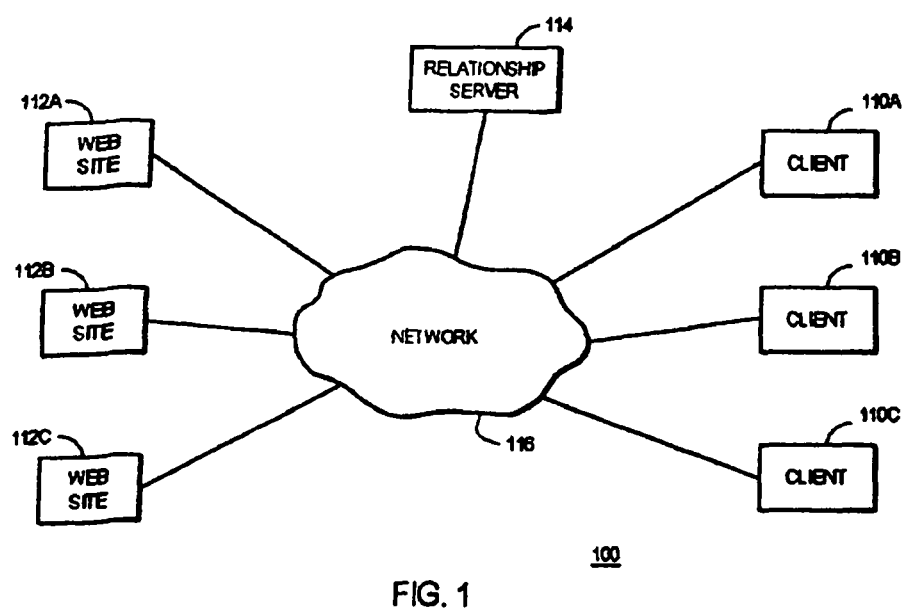
FIG. 1 is a high-level block diagram of one embodiment of a computing environment according to one embodiment of the present invention.

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the invention.

Reference in the specification to "one embodiment" or "an embodiment" means that a particular feature, structure, or characteristic described in connection with the embodiment is included in at least one embodiment of the invention.

The appearances of the phrase "in one embodiment" in various places in the specification are not necessarily all referring to the same embodiment.

It should be appreciated that embodiments of the described inventive body of work can be implemented in numerous ways, including as processes, apparatuses, systems, devices, methods, computer readable media, and/or as a combination thereof. Illustrative embodiments are described below.

In one embodiment, a method for the dynamic validation of metadata correctness is disclosed. End user interactions are used with an object for transmitting metadata information, which allows integration of various types of metadata. Metadata is associated with an object. Each time a user interacts with an object, the current metadata associated with the object is transmitted to a web application. The web application compares the current metadata with the service provider's metadata (if any). If a change has been detected, e.g., a mismatch between the service provider's stored data and the metadata originally transmitted to the web application, the object having inconsistent metadata is tagged for subsequent re-inspection.

Re-inspection process implements a decoupled inspection mechanism, such as a web crawler, that retrieves the object and associated metadata directly from the owner of the metadata. The metadata is inspected and, if a change is valid, the service provider's database is updated. The asynchronous nature of the validation system lends an additional measure of defense by preventing a third party from forging changed metadata information records and inciting the service into generating a denial-of-service attack.

Commonly-assigned U.S. patent application Ser. No. 11/369,562, entitled Using Cross-Site Relationships to Generate Recommendations filed Mar. 1, 2006 ("the '562 application"), which is hereby incorporated by reference in its entirety, describes embodiments of an invention related to determining recommendations by tracking interactions across multiple websites.

Embodiments of the invention may include various processes as set forth below. The processes may be embodied in machine-executable instructions. The instructions can be used to cause a general-purpose or special-purpose processor to perform certain steps. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," "110B," and/or "110C" in the figures).

The client 110 in this embodiment represents a computer system that is used by an end-user to interact with the web sites 112 via the network 116. The client 110 may be, for example, a personal computer or another network-capable device, such as a personal digital assistant (PDA), a cellular telephone, a pager, a video game system, a television "set-top box" etc.

The web sites 112 are locations on the network 116 that provide web pages to the clients 110 via the network 116. The web sites 112 may be, for example, media sites that primarily provide content such as news to the end-users, retailer sites that enable the end-users to purchase items, social networking sites that enable end-users to interact with other people, blogs and hybrid sites that provide a mix of these features. Those of skill in the art will recognize that there are essentially an unlimited number of different types of web sites 112 with which the clients 110 can interact. The web sites 112 may or may not be related or associated with each other as the present invention envisions being applicable in both cases. Although FIG. 1 illustrates three clients 110 and three web sites 112, other embodiments may include any number of clients 110 and web sites 112.

The end-users of the clients 110 interact with the web sites 112. In one embodiment, the interactions establish relationships. For example, an end-user may view a web page for a digital camera, and subsequently view a web page for a memory card for that camera. These actions create relationships between the end-user and the camera, and between the end-user and the memory card. The information from web sites 112 are provided to the relationship server 114.

The web sites 112 receive recommendations from the relationship server 114. These recommendations are provided to the end-users, typically by including the recommendations on web pages served to the end-users' clients 110. The recommendations can be for arbitrary and/or heterogeneous items and the web sites can request that the relationship server 114 provide recommendations for only specified types of items. For example, the recommendations may include items an end-user may want to purchase, news stories the end-user may want to read, musical groups in which the end-user may have interest, discussion groups in which the end-user may want to participate, etc.

The relationship server 114 receives descriptions of interactions that are derived from the web sites 112 and/or clients 110 and provides recommendations based at least in part on these interactions. In one embodiment, the relationship server 114 performs collaborative filtering on the received relationships to generate the recommendations.

Collaborative filtering allows for filtering based on arbitrary labels, predicates, intents, and/or relationships. In one embodiment the collaborative filtering is performed using relationships supplied by multiple web sites 112 and/or clients 110, and the resulting recommendations are of high quality. Moreover, the activities of the end-users that provide personally identifiable information may be tracked across multiple web sites 112 enabling the pool of relationships on which the collaborative filtering is based to be deeper than if only single-site activities were tracked.

The network 116 represents the communication pathways between the clients 110, web sites 112, and relationship server 114. In one embodiment, the network 116 is the Internet. The network 116 can also utilize dedicated or private communications links that are not necessarily part of the Internet. In one embodiment, the network 116 uses standard communications technologies and/or protocols. Thus, the network 116 can include links using technologies such as 802.11, integrated services digital network (ISDN), digital subscriber line (DSL), asynchronous transfer mode (ATM), etc.

Similarly, the networking protocols used on the network 116 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), the web services description language (WSDL), etc.

In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
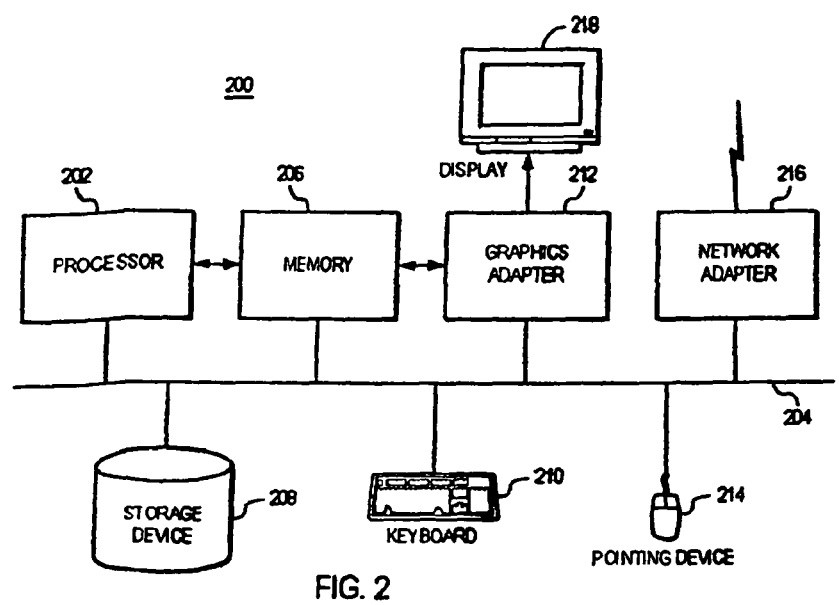
FIG. 2 is a high-level block diagram illustrating one embodiment of a functional view of a computer system.

FIG. 2 is a high-level block diagram illustrating a functional view of a typical computer system 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power required for the entity. For example, the client 110 typically requires less processing power than the web site 112 and relationship server 114. Thus, the client 110 can be a personal computer, cellular telephone, etc.

The web site 112 and relationship server 114 computers, in contrast, may comprise more powerful processors and/or multiple computers working together to provide the functionality described herein. In addition, the computers 200 can lack some of the features shown in FIG. 2. For example, a blade server supporting a web site 112 may lack a keyboard, pointing device, and display. In one embodiment, the computer system 200 serving as the relationship server 114 utilizes a processor 202 and/or memory 206 having a 64-bit word size.

Figure 3:
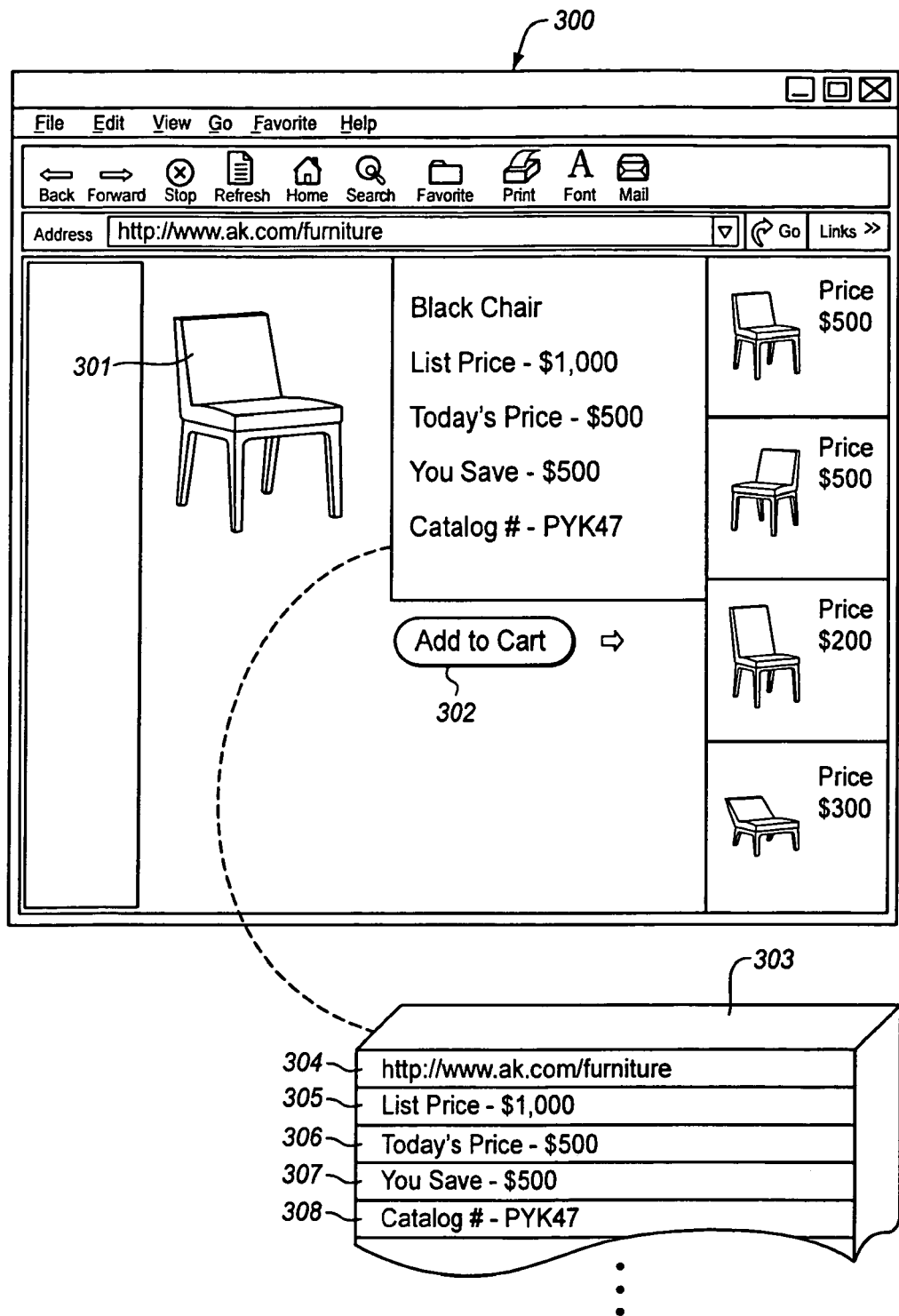
FIG. 3 shows one embodiment of a screen capture depiction of a merchant's store on the World Wide Web.

FIG. 3 shows one embodiment of a merchant store on the World Wide Web. Any object may be displayed in the merchant store. In this particular embodiment, a chair 301 is displayed in the storefront. In other embodiments, different retail items can be displayed or articles from media sites or information on blogs. When an end user decides to purchase the chair 301 by selecting an add to cart icon 302, the metadata 303 is transmitted to a web application (not depicted) for validation. In this embodiment, the metadata 303 includes the items Uniform Resource Locator ("URL") 304, the list price 305, today's price 306, you save 307 and catalog #308. The metadata 303 in one embodiment may be visible to the end user, in other embodiments the metadata 303 may be entirely invisible and in other embodiments there can be a blend of both.

Figure 4:
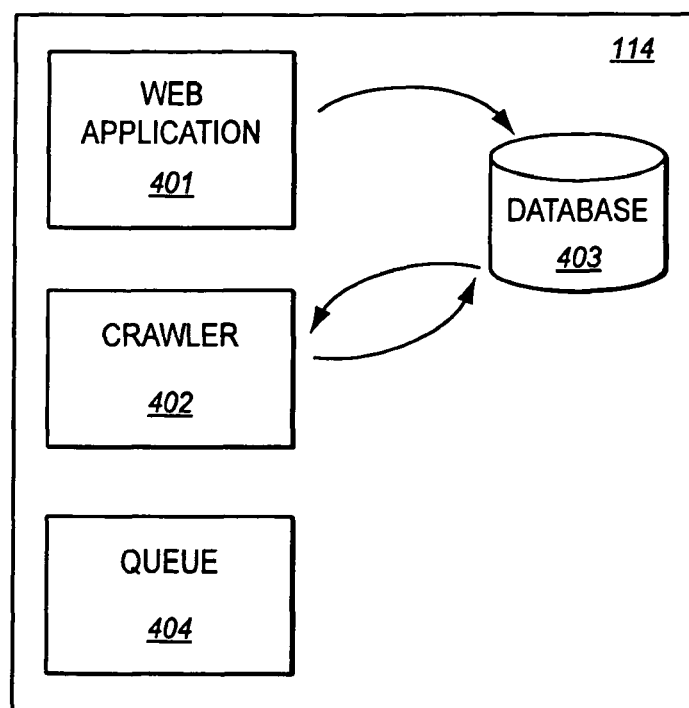
FIG. 4 is a high-level block diagram illustrating one embodiment of a data center.

FIG. 4 is a high-level block diagram illustrating modules within relationship server 114 according to one embodiment of the present invention. Relationship server 114 includes a web application module 401 a crawler 402 and a database 403. Those of skill in the art will recognize that other embodiments can have different and/or other modules than the ones described here, and that the functionalities can be distributed among the modules and/or entities illustrated in FIG. 4 in a different manner.

The web application module 401 receives information from websites 112. In a preferred embodiment information is transmitted based upon client 110 interaction with a website 300. Furthermore, the web application module 401 stores metadata 303 received from a client 110 describing the metadata for a website 112 into database module 403. In one embodiment, these components communicate using a network. In another embodiment, the components are co-located in a single server.

The database module 403 stores metadata in tables. In one embodiment, the database module 403 stores data such as prices, thumbnails and other metadata for retail items. In another embodiment, database module 403 stores data describing news stories, including titles, descriptions and summaries.

The crawler 402 checks the database for existing metadata 303 and updates the table based upon metadata retrieved on its own based upon communications for a website. In one embodiment, the metadata received from a client 110 is compared with the stored metadata in the database 403 by the web application module 401. Changes to the metadata detected by the web application module 401 will then trigger the crawler 402 to verify the metadata via its own communications with the website 112.

Figure 5:
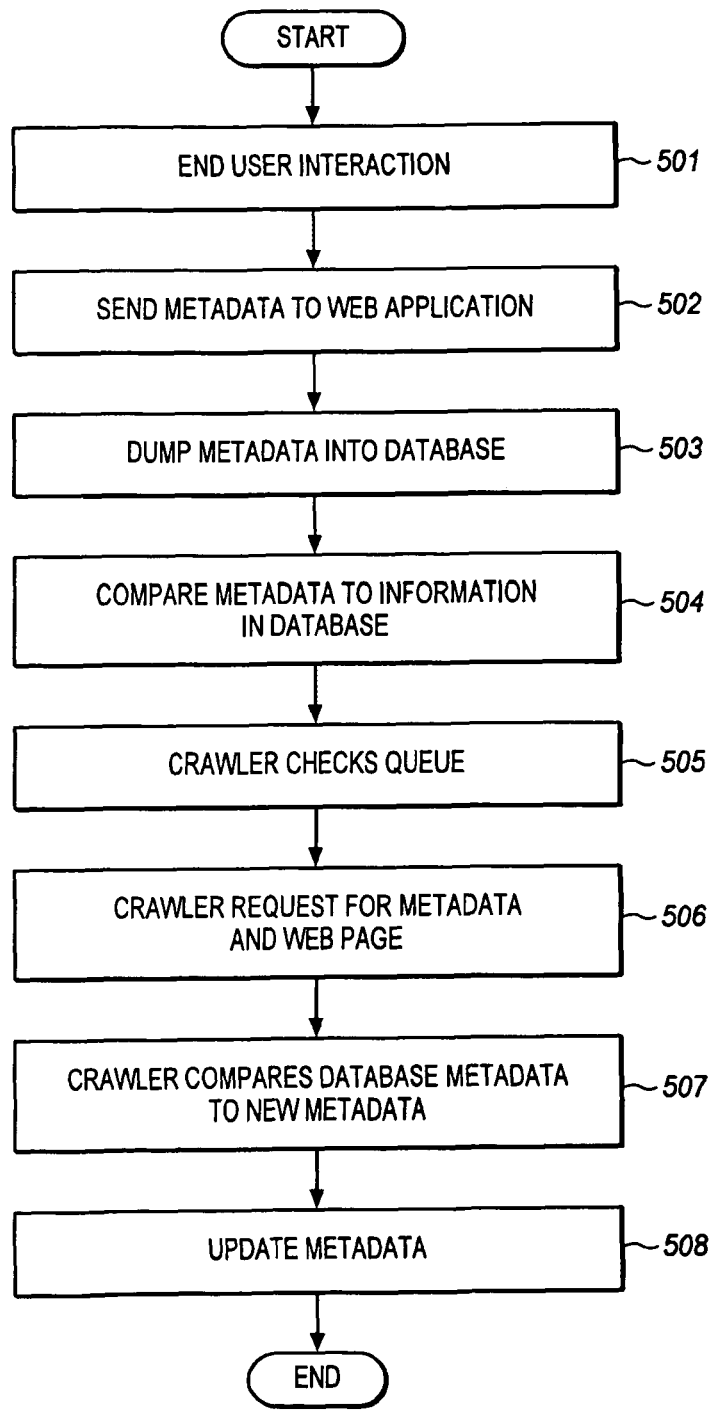
FIG. 5 is a flow chart illustrating one embodiment of checking the accuracy of metadata dynamically.

FIG. 5 is a flow chart illustrating one embodiment for checking the accuracy of metadata dynamically. At processing block 501 metadata 303 that is associated with object 301 is generated in response to a client 110 interaction with a webpage 300. In one embodiment, the interaction with the website 300 that generates the metadata 303 is the "add to cart" action performed by a client on the webpage 300.

However, in other embodiments there are a variety of interactions that could prompt the generation of metadata (e.g., viewing the object, dicking on the object, clicking on a thumbnail representation of the object or any other interaction that one of ordinary skill in the art would appreciate in light of the purpose of the invention). At processing block 502, the metadata 303 is transmitted to the web application 401. The web application subsequently loads the metadata 303 into the database 403, which is illustrated at processing block 503.

At processing block 504, the metadata 303 is analyzed against existing information in the database. For example, the database may have a different price than the received metadata 303, or may have no data at all. In such a case, the metadata 303 is flagged and placed in a verification queue 404 for verification. In processing block 505, the crawler checks queue 404 for metadata 303 that needs verification. In processing block 506, the crawler makes an HTTP request of the website 300 from where the original metadata 303 was derived and receives new metadata and the webpage (e.g., metadata specific to the crawler request). At processing block 507, the crawler compares the new metadata to the flagged metadata. . . . If there is a difference between the flagged metadata and the new metadata the table is updated to reflect the new metadata as illustrated at processing block 508.

Figure 6:
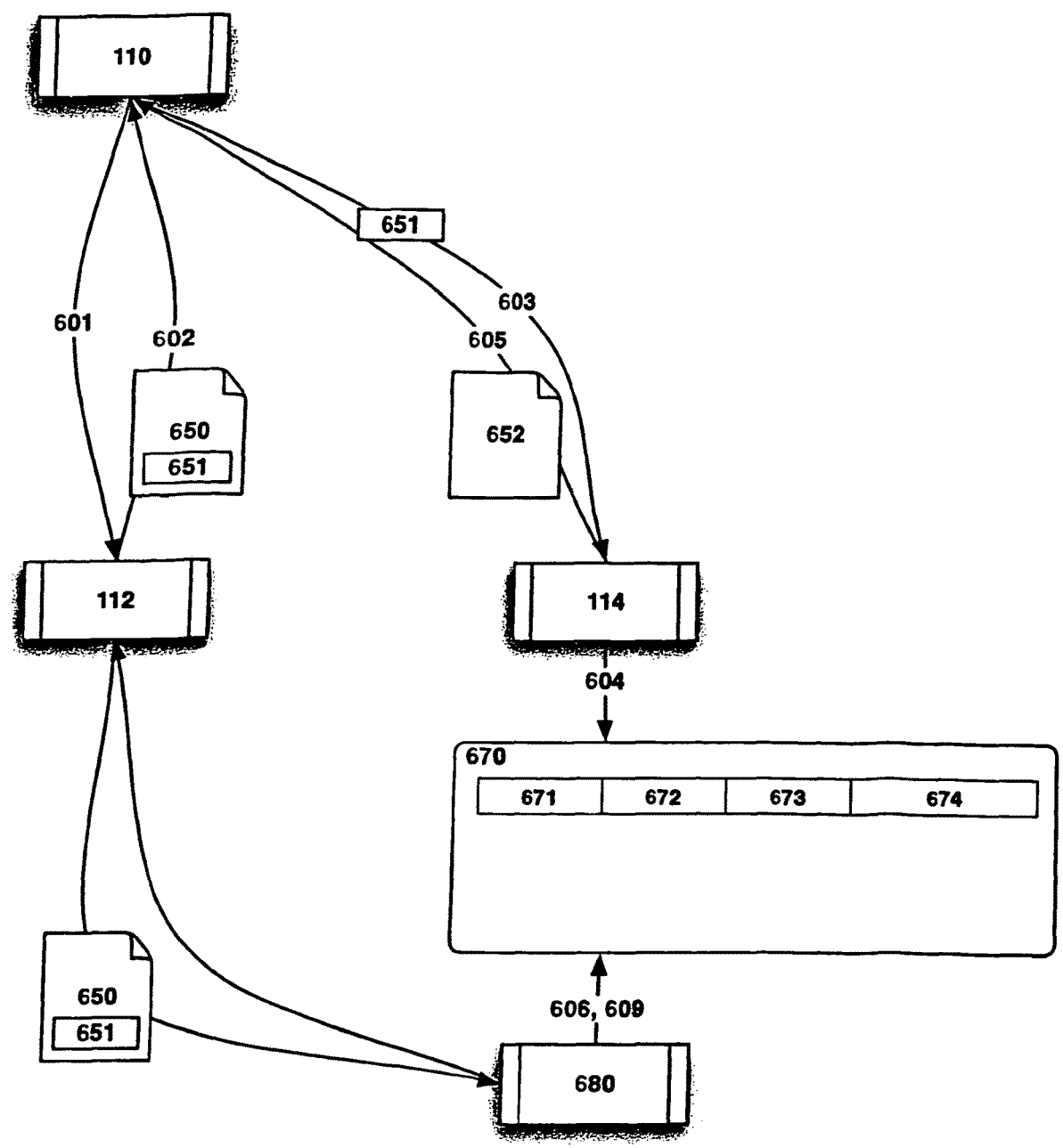
FIG. 6 is an example process of an embodiment enabling maintaining metadata correctness.

FIG. 6 illustrates one embodiment for maintaining metadata correctness. At process 601, the client 110 submits a request for product information to an e-commerce web site 112 via some network 116. At process 602, the web site 112 responds with an HTML-formatted web page, 650, including a discovery service URL, 651 having encoded metadata about the product that was referenced. At process 603, a web browser at client 110 requests the discovery service URL 651 from the relationship server 114.

At process 604, the relationship server 114 checks the metadata provided in the encoded URL 651 during process 603 against a database 670. This database includes a set of columns. The columns include a unique item identifier 671, the last time a request for this item was seen 672, the associated metadata 673, and a flag to indicate pending updates 674. If the metadata provided in the encoded URL 651 matches the metadata 673 associated with the product, then the timestamp 672 is updated and no further work occurs. If the metadata does not match, however, then the pending update field 674 is set for this product. Note that the metadata provided in the URL 651 that has passed through the client 110 is not trusted in any way.

The relationship server 114 then returns a HTML-formatted list of recommendations 652 to the user 110 at process 605. At process 606, the crawler 680 awakens and checks the database 670 for a list of all product identifiers 671 that have the pending update field 674 set. At process 607, for each of these items, it requests the product information from the e-commerce web site 112 via some network (again, not shown here). At process 608, the web site 112 replies with a new copy of the HTML-formatted web page 650, again containing a directory service URL 651 which contains encoded metadata.

Finally at process 609, the web crawler 680 inspects the encoded metadata contained in the discovery service URL 651. It updates the necessary entries in the database 670, modifying the current metadata information 673 and clearing the pending update field 674 for the unique product in question.

Figure 7:
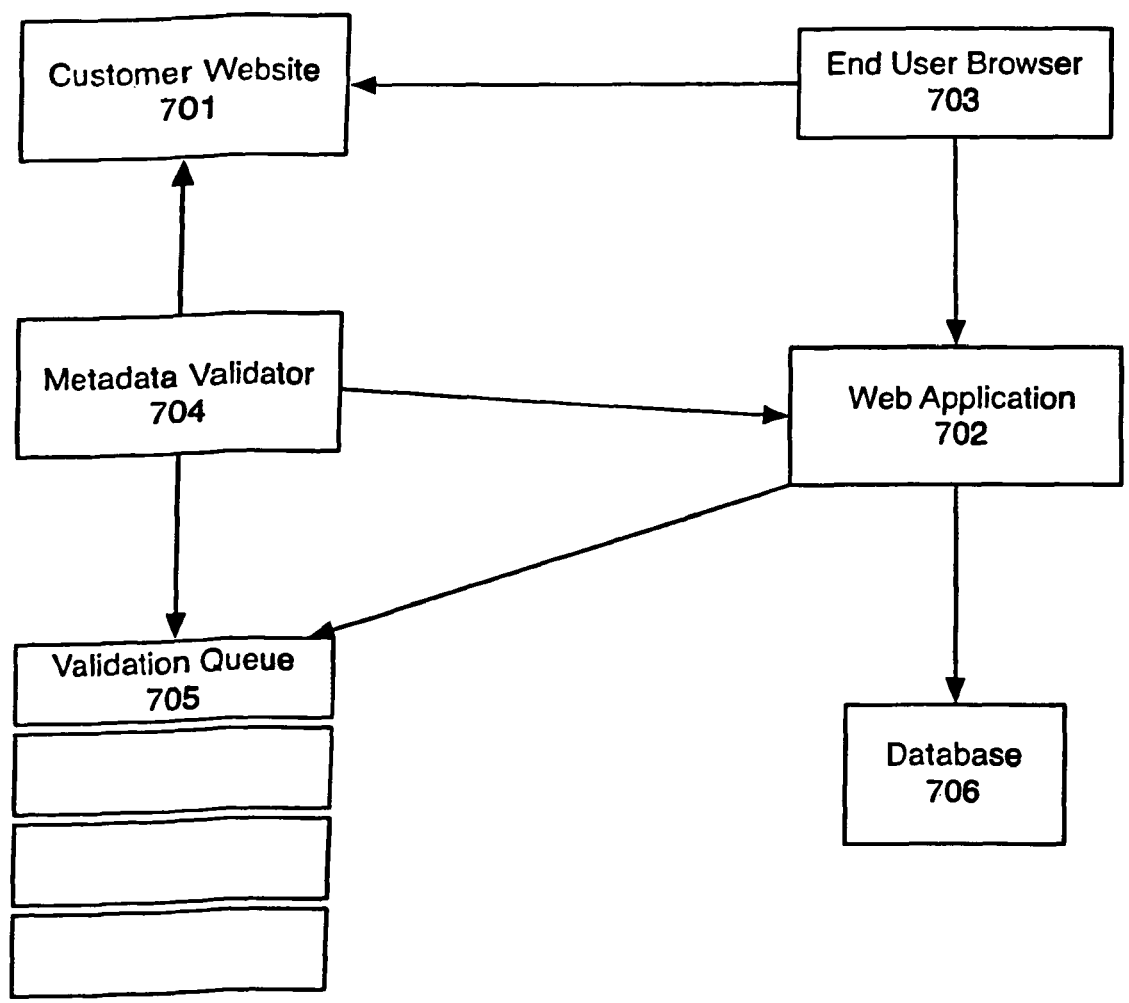
FIG. 7 is an embodiment for dynamically updating metadata.

FIG. 7 illustrates one embodiment of an interaction diagram describing the logical interactions of the components involved in the update of an item's metadata after validation by the crawler mechanism.

An end user browser 703 requests a page from a customer website 701 which describes an item with metadata. In one embodiment, the page describing the item includes a reference to the web application 702. In another embodiment, the end user browser 703 includes a module that communicates with the web application 702.

The end user browser 703 connects to the web application 702 to request content. In a preferred embodiment, the end user browser 703 transmits a copy of the metadata describing the item to the web application 702 along with the content request. In another embodiment, the end user browser 703 makes a separate request to transmit the metadata to the web application 702. In yet another embodiment, the end user browser 703 transmits logically invalid metadata to the web application 702 to force trigger a crawler refresh.

The web application 702 compares the metadata received from the end user browser 703 with the metadata stored in the database 706. If the metadata differs, an identifier for the page is placed in the validation queue 705. In one embodiment, the identifier for the page is the URL of the page. In another embodiment, the identifier for the page can be an external reference such as a database primary key.

The metadata validator 704 removes items from the validation queue 705 to validate. In one embodiment, the metadata validator 704 periodically polls the validation queue 705. In another embodiment, the validation queue 705 notifies the metadata validator 704 when items are available to validate. In yet another embodiment, the web application 702 can directly notify the metadata validator 704 without using the validation queue 705.

When an item is received to validate, the metadata validator 704 fetches a copy of the page from the customer website 701. In a preferred embodiment, the metadata validator 704 executes dynamic content in the page to emulate the operation of the end user browser 703, transmitting the metadata for the item to the web application 702. In another embodiment, the metadata validator 704 reads the metadata from the page and transmits it to the web application 702.

When the web application 702 receives the metadata from the metadata validator 704, it stores the metadata values in the database 706, overwriting any potentially existing values.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of operating a computing system, the method comprising:

receiving, with one or more computing devices and from an end user browser, a copy of metadata describing an item on a webpage;

comparing the metadata with further metadata of the webpage stored in a database;

determining whether the metadata differs from the further metadata;

based on determining the metadata differs from the further metadata, placing an identifier for the webpage in a validation queue;

fetching at a later time a copy of the webpage using the identifier;

extracting updated metadata from the copy of the webpage; and overwriting existing values of the further metadata with the updated metadata.

2. The method of claim 1, wherein the identifier is a uniform resource locator (URL).

3. The method of claim 1, wherein the identifier is a database primary key.

4. The method of claim 1, wherein the fetching of the copy of the webpage is performed using a crawler process.

5. A non-transitory computer readable medium storing instructions, that when executed by one or more processors of a computing system, perform operations comprising:
   receiving, from an end user browser, a copy of metadata describing an item on a webpage;
   comparing the metadata with further metadata of the webpage stored in a database;
   determining whether the metadata differs from the further metadata;
   based on determining the metadata differs from the further metadata, placing an identifier for the webpage in a validation queue;
   fetching at a later time a copy of the webpage using the identifier;
   extracting updated metadata from the copy of the webpage; and
   overwriting existing values of the further metadata with the updated metadata.

6. The non-transitory computer readable medium of claim 5, wherein the identifier is a uniform resource locator (URL).

7. The non-transitory computer readable medium of claim 5, wherein the identifier is a database primary key.

8. The non-transitory computer readable medium of claim 5, wherein the fetching of the copy of the webpage is performed using a crawler process.

9. A computing system comprising:
   a memory storing instructions; and
   one or more processors, coupled to the memory, configured to process the stored instructions to perform operations comprising:
      receiving, from an end user browser, a copy of metadata describing an item on a webpage;
      comparing the metadata with further metadata of the webpage stored in a database;
      determining whether the metadata differs from the further metadata;
      based on determining the metadata differs from the further metadata, placing
      an identifier for the webpage in a validation queue;
      fetching at a later time a copy of the webpage using the identifier;
      extracting updated metadata from the copy of the webpage; and
      overwriting existing values of the further metadata with the updated metadata.

10. The computing system of claim 9, wherein the identifier is a uniform resource locator (URL).

11. The computing system of claim 9, wherein the identifier is a database primary key.

12. The computing system of claim 9, wherein the fetching of the copy of the webpage is performed using a crawler process.

* * * * *